United States Patent
Lees et al.

[15] 3,691,086
[45] Sept. 12, 1972

[54] OIL-WATER SEPARATIONS

[72] Inventors: Ronald D. Lees, Houston, Tex.; Ronald W. Smith, Wilmington, Del.

[73] Assignee: Hercules Incorporated, Wilmington, Del.

[22] Filed: July 31, 1970

[21] Appl. No.: 60,137

[52] U.S. Cl. ................252/329, 252/340, 252/344, 252/341
[51] Int. Cl. ............................................B01d 17/04
[58] Field of Search......252/329, 326, 328, 340, 344, 252/341

[56] References Cited
UNITED STATES PATENTS 2,915,476   12/1959   Shen..........................252/341

*Primary Examiner*—John D. Welsh
*Attorney*—Michael B. Keehan

[57] ABSTRACT

Disclosed is a process of facilitating the separation of oil from oil-in-water liquid emulsion systems. The system is contacted with a separation aid including either (1) certain polymers, (2) polymers in conjunction with certain salts, or (3) polymers in conjunction with salts and silica sol. The polymers are water soluble cationic vinyl polymers. The salts are water soluble salts of polyvalent metals which salts in water solution give an acid reaction.

18 Claims, No Drawings

OIL-WATER SEPARATIONS

The present invention relates to a process of facilitating the separation of oil from oil-in-water liquid emulsion systems employing certain separation aids.

The term "emulsion" is used herein to also comprise a dispersion.

The term "oil" is used herein to mean any substantially lipophilic (oil-loving) or hydrophobic (water-fearing) material which is a liquid at room temperature and atmosphere pressure and includes e.g. petroleum products, animal oils, vegetable oils, and silicone oils.

Carrying out the separations to which the present invention is applicable presents a substantial problem in many industries and processes, including e.g. crude oil production, oil refineries, waste streams from metal working industries, and vegetable oil production.

Preferably the separation aids employed in the present invention are certain polymers as hereinafter defined in conjunction with a water soluble salt of a polyvalent metal which salt in water solution gives an acid reaction, specifically preferred being said polymers in conjunction with both said salt and silica sol. However said polymers can be used alone.

In accordance with the present invention it has been found that the separation of oil from an oil-in-water liquid emulsion system is greatly facilitated by carrying out the process which comprises contacting the system with (1) a polymer as hereinafter defined, or (2) with said polymer and said salt, or (3) with said polymer and said salt, or (3) with said polymer and said salt plus silica sol.

As substantiated by the examples given hereinafter several substantial benefits are realized from practicing the present invention. These benefits include e.g. (1) increasing the rate of oil separation and (2) increasing the percentage of oil separated. More specifically (1) the oil flocs or aggregates which form are larger and form faster, and (2) more oil is separated from a given system.

The following examples illustrate specific embodiments of the present invention. These examples are not intended to limit the present invention to any greater extent than do the appended claims. In the examples and elsewhere herein per cent and parts are by weight unless otherwise specified.

EXAMPLES 1–5

Motor Oil (SAE 30) EMULSION

In each example 150 p.p.m. SAE 30 motor oil was emulsified in distilled water by shearing 10 minutes with a high speed mixer. Then separation aid was added to the emulsion in a bottle. The bottle was inverted five times by hand to mix the separation aid with the emulsion, and then allowed to stand 15 minutes while making visual observations.

Further details appear in Table 1 hereinafter.

TABLE 1

MOTOR OIL (SAE 30) EMULSION

| Ex. No. | Separation Aid, p.p.m. (a) 83% Acrylamide—17% MTMMS (b) Copolymer (c) | Alum (d) | Oil-Water Separation Visual Observation(e) |
|---|---|---|---|
| 1 | none | none | very poor |
| 2 | none | 320 | poor |
| 3 | 0.80 | 320 | good |
| 4 | none | 640 | about same as Ex. 3 |
| 5 | 0.40 | 640 | about same amount as Exs. 3 & 4 but faster separation and larger floc |

(a) by weight of total emulsion
(b) MTMMS is beta-methacryloyloxyethyltrimethylammonium methyl sulfate.
(c) copolymer added as a 0.1% aqueous solution
(d) alum added as a 1.0% aqueous solution
(e) comparing approximate amount oil separated, separation rate, and floc size

EXAMPLES 6–22

MINERAL OIL EMULSION HAVING ANIONIC SURFACTANT

In these Examples 6–22 a 2,000 p.p.m. white mineral oil (Fractol) dispersion in distilled water was prepared by mixing for several minutes in a Waring Blendor. This dilute oil-in-water emulsion also contained 5 p.p.m. anionic surfactant ("Ultra Wet 30 DS"). 100 ml. of the dispersion was placed in a 250-ml. graduated separatory funnel and the separation aid added thereto. The funnel was stoppered and inverted five times to mix the separation aid with the emulsion. After standing 3 mins., 100 ml. of air-saturated distilled water at 60–80 psig. was introduced into the bottom of the funnel. The funnel was allowed to stand for 10 minutes to allow oil-water separation to occur via flotation, then the amount of oil separated was measured. Polymer was used as a 0.1 percent solution in distilled water. Alum was used as a 1.0 percent solution of reagent grade aluminum sulfate ($Al_2(SO_4)_3 \cdot 18H_2O$) in distilled water. In the preparation of the silica sol, 348.4 g. of sodium silicate (N silicate) was diluted to one liter with distilled water. An ammonium sulfate solution was prepared by dissolving 66.0 g. reagent grade $(NH_4)_2SO_4$ in one liter of distilled water. 5.0 ml. of the above sodium silicate solution was added to 10 ml. of distilled water in a 100 ml. graduated cylinder, shaking to mix, and adding 5.0 ml. of the above ammonium sulfate solution followed by further mixing, 5 min. aging, and dilution to 100 ml. This procedure produced a silica sol stock solution in which an addition of 1 ml. of stock solution per liter of emulsion is equivalent to a dosage of 5 p.p.m. $SiO_2$ or 17.4 p.p.m. N sodium silicate.

Further details appear in Table 2 hereinafter.

TABLE 2

MINERAL OIL EMULSION HAVING ANIONIC SURFACTANT

| Ex. No. | Separation Aid, p.p.m. (a) Polymer(b) Name | Amt. | Alum (c) | Silica Sol (as $SiO_2$) | % Oil Separated (d) |
|---|---|---|---|---|---|
| 6 | none | none | none | none | 71 |
| 7 | none | none | 175 | none | 91 |
| 8 | 83% Acrylamide-17% MTMMS Copolymer(e) | 3 | none | none | 91 |
| 9 | 83% Acrylamide-17% MTMMS Copolymer | 3 | 175 | none | 92 |
| 10 | none | none | 50 | 25 | 94 |
| 11 | none | none | 25 | 12.5 | 92 |
| 12 | 83% Acrylamide-17% MTMMS Copolymer | 0.1 | 25 | 12.5 | 81 |
| 13 | 83% Acrylamide-17% MTMMS Copolymer | 1.0 | 25 | 12.5 | 98 |

| | | | | | |
|---|---|---|---|---|---|
| 14 | 83% Acrylamide-17% MTMMS Copolymer | 5.0 | 25 | 12.5 | 85 |
| 15 | 83% Acrylamide-17% MTMMS Copolymer | 25 | 25 | 12.5 | 80 |
| 16 | Poly(MTMMS) | 1.0 | 25 | 25 | 82 |
| 17 | Poly(DMDAC) (f) | 1.0 | 25 | 25 | 85 |
| 18 | 50% Acrylamide-50% DMDAC Copolymer | 1.0 | 25 | 25 | 82 |
| 19 | Poly(DMVPMS) (g) | 1.0 | 25 | 25 | 85 |
| 20 | 85% Acrylamide-15% DMVPMS Copolymer | 1.0 | 25 | 25 | 84 |
| 21 | 83% Acrylamide-17% MTMMS Copolymer | 1.0 | 25 $Fe_2(SO_4)_3$ | 12.5 | 83 |
| 22 | 83% Acrylamide 17% MTMMS Copolymer | 1.0 | 25 $AlCl_3$ | 12.5 | 82 |

(a) by weight of total emulsion
(b) polymer added as a 0.1% aqueous solution
(c) alum added as a 1.0% aqueous solution
(d) % by weight of total emulsion
(e) MTMMS is beta-methacryloyloxyethyltrimethylammonium methyl sulfate
(f) DMDAC is dimethyldiallylammonium chloride
(g) DMVPMS is 1,2-dimethyl-5-vinylpyridinium methyl sulfate

EXAMPLES 23–26

Locomotive Washing Plant Waste Stream Having Anionic and Nonionic Surfactants

In these Examples 23–26 the waste stream contained a total of 4,000 p.p.m. of a nonaqueous liquid phase comprising 3,500 p.p.m. of a used lubricating oil-fuel oil mixture plus 500 p.p.m. of a mixture of anionic and nonionic surfactants.

To 250 mls. of the waste contained in a 500 ml. separatory funnel was added silica sol and a 1 percent aqueous solution of alum. The contents were mixed by inverting the funnel 10 times by hand. Copolymer was then added as a 0.1 percent aqueous solution and the contents mixed as before.

To this mixture was added 250 mls. of water saturated with air at 60 p.s.i.g. The waste was allowed to stand for 10 minutes after which time a sample of the subnatant liquid was removed and its turbidity measured using a Klett-Sommerson photoelectric colorimeter.

When a Klett-Sommerson photoelectric colorimeter is used it is calibrated against distilled water which is assumed to have zero turbidity on a scale of 0–1,000 Klett units. In general visible turbidity occurs at about 30 Klett units and complete cloudiness at about 250–300 Klett units, depending on the refractive index of the suspended material. The higher reading of 68 Klett units in Example 26 is explained by the fact that the subnatant appeared to be clear but was yellow colored.

Further details appear in Table 3 hereinafter.

TABLE 3

LOCOMOTIVE WASHING PLANT WASTE STREAM HAVING ANIONIC AND NONIONIC SURFACTANTS

| | Separation Aid, p.p.m.(a) | | | |
|---|---|---|---|---|
| Ex. No. | 83% Acrylamide—17% MTMMS(b) Copolymer (c) | Alum(d) | Silica Sol (as $SiO_2$) | Klett Units |
| 23 | none | none | none | 373 |
| 24 | none | 160 | none | 270 |
| 25 | none | 160 | 160 | 180 |
| 26 | 4 | 160 | 160 | 68 |

(a) by weight of total waste
(b) MTMMS is beta-methacryloyloxyethyltrimethylammonium methyl sulfate
(c) copolymer added as a 0.1% aqueous solution
(d) alum added as a 1.0% aqueous solution

EXAMPLES 27–29

Oil Refinery Waste Stream

In these Examples 27–29 to a 500 ml. sample of the oil-water emulsion waste contained in a 500 ml. separatory funnel was added copolymer as a 0.1 percent aqueous solution. The contents were mixed by inverting the funnel five times by hand and allowing to stand for 30 minutes. The clarity of the subnatant water phase was determined by the Klett method.

Further details appear in Table 4 hereinafter.

TABLE 4

OIL REFINERY WASTE STREAM

| | Separation Aid, p.p.m. (a) | | |
|---|---|---|---|
| Ex. No | 83% Acrylamide—17% MTMMS(b) Copolymer (c) | Klett Units | Remarks |
| 27 | none | 110 | Tan subnatant |
| 28 | 2 | 80 | Medium floc. Fair flotation |
| 29 | 4 | 30 | Medium floc. Good flotation Clear subnatant |

(a) by weight of total waste
(b) MTMMS is beta-methacryloyloxyethyltrimethylammonium methyl sulfate
(c) copolymer added as a 0.1% aqueous solution

EXAMPLES 30–34

MOTOR OIL (SAE 30) EMULSION HAVING NONIONIC SURFACTANT

In these Examples 30–34 the emulsion contained by weight thereof 2,000 p.p.m. SAE 30 motor oil and 100 p.p.m. nonionic surfactant, the surfactant being marketed as "Triton X–100."

The procedure employed was the same as that in Examples 23—26 hereinbefore.

Further details appear in Table 5 hereinafter

TABLE 5

MOTOR OIL (SAE 30) EMULSION HAVING NONIONIC SURFACTANT

| | Separation Aid, p.p.m.(a) | | | % Oil Separated (e) |
|---|---|---|---|---|
| Ex. No. | 83% Acrylamide-17% MTMMS(b) Copolymer (c) | Alum (d) | Silica Sol (as $SiO_2$) | |
| 30 | none | none | none | 66 |
| 31 | none | 25 | 12.5 | 74 |
| 32 | 1 | 25 | 12.5 | 87 |
| 33 | none | 50 | 25 | 88 |
| 34 | 1 | 50 | 25 | 95 |

(a) by weight of total emulsion
(b) MTMMS is beta-methacryloyloxyethyltrimethylammonium methyl sulfate
(c) copolymer added as a 0.1% aqueous solution
(d) alum added as a 1.0% solution
(e) % by weight of total emulsion From the foregoing examples it will be seen that in accordance with the present invention (1) employing as separation aid the polymers hereof gives substantial improvement in oil separation, (2) employing as separation aid said polymers in conjunction with said salt gives an additional improvement, and (3) employing as separation aid said polymers in conjunction with both said salt and silica sol gives a still greater improvement.

Water soluble polymers applicable herein as separation aids include:

1. Vinyl homopolymers containing quaternary ammonium groups.
2. Vinyl polymers containing both quaternary ammonium groups and tertiary amine groups, the amount of quaternary ammonium groups being greater than the amount of tertiary amine groups.
3. Copolymers of vinyl monomers containing quaternary ammonium groups and up to 99 percent by weight of the total of acrylamide or acrylamide substituted on the alpha carbon atom or on the nitrogen atom.
4. Terpolymers of vinyl monomers containing quaternary ammonium groups, vinyl monomers containing tertiary amine groups, and up to 99 percent by weight of the total of acrylamide or acrylamide substituted on the alpha carbon atom or on the nitrogen atom, the amount of quaternary ammonium groups in the terpolymer being greater than the amount of tertiary amine groups.

In 1 above a vinyl monomer containing a quaternary ammonium group is homopolymerized.

In 2 above a vinyl polymer is prepared either (a) by copolymerizing a vinyl monomer containing a quaternary ammonium group and a vinyl monomer containing a tertiary amine group, or (b) by polymerizing a vinyl monomer containing a tertiary amine group and then quaternizing the resulting polymer.

In 3 above a vinyl monomer containing a quaternary ammonium group is copolymerized with acrylamide or a substituted acrylamide.

In 4 above a terpolymer is prepared either (a) by polymerizing a mixture of three monomers (i.e. a vinyl monomer containing a quaternary ammonium group, a vinyl monomer containing a tertiary amine group, and acrylamide or a substituted acrylamide) or (2) by copolymerizing a vinyl monomer containing a tertiary amine group with acrylamide or a substituted acrylamide and then quaternizing the resulting copolymer to convert a majority of the tertiary amine groups to quaternary ammonium groups.

The acrylamide and substituted acrylamides applicable herein include compounds having the formula

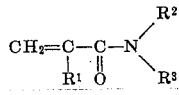

wherein $R_1$, $R^2$ and $R^3$ are each hydrogen or lower alkyl (e.g. of one to four carbon atoms), specific examples of which include acrylamide, methacrylamide, N-isopropyl acrylamide.

The following are typical examples of the polymers in 1 above:

A. Homopolymers of acrylate and methacrylate alkyl esters containing quaternary ammonium groups particularly those of two to four carbon atoms in the alkylene group, e.g.
  poly($\beta$-acryloyloxy-n-butyldiethylmethylammonium methyl sulfate)
  poly($\beta$-methacryloyloxyethyldimethylbenzylammonium chloride)
  a. Homopolymers of acrylate and methacrylate ethyl esters containing quaternary ammonium groups having three alkyl substituents of one or two carbon atoms, e.g.
    poly(acryloyloxyethyltrimethylammonium methyl sulfate)
    poly($\beta$-methacryloyloxyethyltrimethylammonium methyl sulfate)
    poly($\beta$-methacryloyloxyethyldiethylmethylammonium methyl sulfate)
    poly($\beta$-methacryloyloxyethyldimethylethylammonium chloride)
B. Homopolymers of a vinyl quaternary pyridinium salt wherein the pyridinium ring contains zero to two alkyl substituents of one or two carbon atoms attached to carbon atoms in the pyridinium ring in addition to the vinyl group and the substituent on the nitrogen, e.g.
  poly(1-benzyl-2-methyl-5-vinylpyridinium chloride)
  poly(1-hydroxyethyl-4-vinylpyridinium bromide)
  1. Homopolymers of a vinyl quaternary pyridinium salt wherein the pyridinium ring contains one to three alkyl substituents of one or two carbon atoms, e.g.
    poly(1,2-dimethyl-5-vinylpyridinium methyl sulfate)
    poly(1,2-dimethyl-5-vinylpyridinium chloride)
C. Homopolymers of quaternary diallylammonium salts, e.g.
  poly(benzylmethyldiallylammonium chloride)
  poly(hydroxyethylethyldiallylammonium bromide)
  1. Homopolymers of quaternary diallyldialkylammonium salts wherein the two alkyl groups contain one or two carbon atoms, e.g.
    poly(dimethyldiallylammonium methyl sulfate)
    poly(methylethyldiallylammonium bromide)
D. Homopolymers of ethyl vinyl ethers having quaternary ammonium groups in the beta position on the ethyl group, e.g.
  poly(2-ethyldiethylbenzylammonium chloride vinyl ether)
  poly(2-ethyltriethylethylammonium sulfate vinyl ether)
  1. Homopolymers of ethyl vinyl ethers having quaternary ammonium groups in the beta position on the ethyl group, the quaternary ammonium groups having three substituents of one or two carbon atoms, e.g.
    poly(2-ethyltrimethylammonium methyl sulfate vinyl ether)

The following are typical examples of polymers in 2 above:

$\beta$-methacryloyloxyethyldimethylamine and
$\beta$-methacryloyloxyethyltrimethylammonium methyl sulfate copolymer 2-vinylpyridine and
1-benzyl-2-methyl-5-vinylpyridinium chloride copolymer poly($\beta$-dimethylaminoethylmethacrylate) reacted with dimethyl sulfate to convert more than 50 percent of the tertiary amine groups to quaternary ammonium groups poly(methyldiallylamine) reacted with epichlorohydrin to convert more than 50 percent of the tertiary amine groups to quaternary ammonium groups The following are typical examples of polymers in 3 above:

A. Copolymers of acrylamide or substituted acrylamides and acrylate or methacrylate alkyl esters containing quaternary ammonium groups particularly those of two to four carbon atoms in the alkylene group, e.g. copolymers of acrylamide and $\beta$methacryloyloxyethyldimethylethylammonium chloride acrylamide and acryloyloxyethyltrimethylammonium methyl sulfate acrylamide and $\beta$-methacryloyloxyethyltrimethylammonium methyl sulfate acrylamide and $\beta$-methacryloyloxyethyldiethylmethylammonium methyl sulfate B. Copolymers of acrylamide or substituted acrylamides and a vinyl quaternary pyridinium salt wherein the pyridinium ring contains zero to two alkyl substituents of one or two carbon atoms attached to carbon atoms in the pyridinium ring, e.g. copolymers of acrylamide and 1,2-dimethyl-5-vinylpyridinium methyl sulfate methacrylamide and 1-benzyl-2-vinylpyridinium chloride C. Copolymers of acrylamide or substituted acrylamides and quaternary dialkyldiallylammonium salts, e.g. copolymers of acrylamide and dimethyldiallylammonium chloride D. Copolymers of acrylamide or substituted acrylamides and ethyl vinyl ethers having quaternary ammonium groups in the beta position on the ethyl group, e.g. copolymers of acrylamide and 2-ethyltrimethylammonium methyl sulfate vinyl ether The following are typical examples of polymers in 4 above:

acrylamide, $\beta$-acryloyloxyethyldimethylamine, and $\beta$-acryloyloxyethyltrimethylammonium methyl sulfate terpolymer methacrylamide and $\beta$-methacryloyloxyethyldimethylamine copolymer reacted with dimethyl sulfate to convert more than 50 percent of the tertiary amine groups to quaternary ammonium groups.

Preferred polymers applicable herein within the foregoing polymer definition include poly(trialkylaminoalkyl acrylate or methacrylate salts), specific examples of which include poly($\beta$-acryloyloxyethyltrimethylammonium methyl sulfate), poly($\beta$-methacryloyloxyethyltrimethylammonium methyl sulfate), poly($\beta$-acryloyloxyethyldiethylmethylammonium methyl sulfate), poly($\beta$-methacryloyloxyethyldiethylmethylammonium methyl sulfate), and poly(vinylpyridinium salts), specific examples of which include poly(1,2-dimethyl-5-vinylpyridinium methyl sulfate), poly(1-methyl-4-vinylpyridinium methyl sulfate).

Polymers applicable herein containing acrylamide may contain up to 99 (preferably up to about 95) weight percent thereof of acrylamide, those containing up to about 50–60 percent of acrylamide being specifically preferred. Substantially the same applies to acrylamide substituted on the alpha carbon atom or on the nitrogen atom. For instance with acrylamide and $\beta$-methacryloyloxyethyltrimethylammonium methyl sulfate copolymers they may be by weight thereof 99 percent–20 percent acrylamide and 1 percent–80 percent $\beta$-methacryloyloxyethyltrimethylammonium methyl sulfate, preferably 97 percent–50 percent acrylamide and 3 percent–50 percent $\beta$-methacryloyloxyethyltrimethylammonium methyl sulfate, 95 percent–60 percent acrylamide and 5 percent–40 percent $\beta$-methacryloyloxyethyltrimethylammonium methyl sulfate being specifically preferred.

Any suitable quaternizing agent of the many that are well known in the art can be used in the present invention. Those suitable include for instance the lower alkyl esters of mineral acids such as e.g. the halides, sulfates and phosphates, substituted alkyl halides, and so on. Illustrative of the compounds which may be used are dimethyl and diethyl sulfate, methyl chloride, methyl iodide, methyl bromide, ethyl chloride, ethyl bromide, propyl bromide, 1,3-dichloropropanol-2, 1-chloroglycerol, and so on. Examples of other materials which may be used are benzyl chloride, m ethyl p-toluene sulfonate, allyl chloride, ethylene bromohydrin, epichlorohydrin.

The extent of quaternization in the present invention should be such that in excess of 50 percent of the tertiary amine groups are converted to quaternary ammonium groups. Preferably about 55–70 percent of the tertiary amine groups will be converted to quaternary ammonium groups, about 70–95 percent being specifically preferred.

The salts applicable herein as separation aids comprise e.g. water soluble salts of polyvalent metals, which salts in water solution give an acid reaction, including e.g. $Al^{+++}$ or $Fe^{+++}$ or both. Particularly good results have been obtained with for instance alum [i.e. $Al_2(SO_4)_3$], $AlCl_3$, $Fe_2(SO_4)_3$ and $FeCl_3$. Mixtures of two or more such salts may also be used.

Various means are known for preparing silica sol, and the products are applicable herein as separation aids. Thus silica sol useful in practicing the present invention can be prepared by reacting sodium silicate with chemicals including for instance ammonium sulfate, sodium bicarbonate, carbon dioxide, sodium silicofluoride, sulfuric acid.

Although the order of addition of the separation aids hereof is not critical preferably the order of addition is salts followed by silica sol and then polymers.

The amounts of separation aid applicable in the present invention are not critical and can vary widely. The conditions affecting amounts of separation aid used are known and include e.g. the concentration of emulsified oil as well as the nature and concentration of any surfactant present. Usually the amount of said salt used is dependent on both the concentration of oil and the concentration of surfactant, whereas the amount of polymer used is usually more dependent on oil concentration. Employing separation aid in accordance with the following amounts (p.p.m. by weight total emulsion) gives satisfactory results: 0.05–100 (preferably 0.1–25) polymer, 1–5,000 (preferably 10–1,000) said salt, and 0.5–2,000 (preferably 5–500) silica sol expressed as $SiO_2$.

The present invention is applicable in the promotion of oil separation from oil-in-water emulsions employing all known types of separation processes including e.g. the following:
1. flotation
   a. froth flotation
   b. dissolved air or pressure flotation
   c. self flotation (i.e. no air or other gas added)
2. sedimentation (where oil phase contains solids or other weighting agents which render the oil phase more dense than the water phase)
3. centrifugation Oil-in-water emulsions to which the present invention applies can contain any amount of oil and water provided water is the continuous phase. While many oil-in-water emulsions encountered in industrial applications also contain some solid particles in addition to the oil and water phases (and the present invention is applicable thereto), the present invention represents a liquid-liquid separation process (i.e. the separation of oil from water).

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. Process of facilitating the separation of oil from an oil-in-water liquid emulsion system comprising contacting the system with a water soluble polymer from the following:
   a. vinyl homopolymers selected from the group consisting of homopolymers of acrylate and methacrylate alkyl esters containing quaternary ammonium groups;
   b. vinyl polymers containing both quaternary ammonium groups and tertiary amine groups, said vinyl polymers selected from the group consisting of the copolymer of β-methacryloyloxyethyldimethylamine and β-methacryloyloxyethyltrimethylammonium methyl sulfate; poly(β-dimethylaminoethylmethacrylate) reacted with dimethyl sulfate, and poly(methyldiallylamine) reacted with epichlorohydrin; the amount of quaternary ammonium groups in the polymer being greater than the amount of tertiary amine groups;
   c. copolymers of vinyl monomers containing quaternary ammonium groups and up to 99 percent by weight of the total of acrylamide or acrylamide substituted on the alpha carbon atom or on the nitrogen atom;
   d. terpolymers of vinyl monomers containing quaternary ammonium groups, vinyl monomers containing tertiary amine groups, and up to 99 percent by weight of the total of acrylamide or acrylamide substituted on the alpha carbon atom or on the nitrogen atom, the amount of quaternary ammonium groups in the terpolymer being greater than the amount of tertiary amine groups; or
   e. homopolymers of quaternary diallylammonium salts.

2. Process of claim 1 wherein the polymer is a vinyl homopolymer selected from the group consisting of homopolymers of acrylate and methacrylate alkyl esters containing quaternary ammonium groups.

3. Process of claim 1 wherein the polymer is a vinyl polymer containing both quaternary ammonium groups and tertiary amine groups, said vinyl polymers selected from the group consisting of the copolymer of β-methacryloyloxyethyldimethylamine and β-methacryloyloxyethyltrimethylammonium methyl sulfate; poly(β-dimethylaminoethylmethacrylate) reacted with dimethyl sulfate, and poly(methyldiallylamine) reacted with epichlorohydrin; the amount of quaternary ammonium groups being greater than the amount of tertiary amine groups.

4. Process of claim 1 wherein the polymer is a copolymer of a vinyl monomer containing quaternary ammonium groups and up to 99 percent by weight of the total of acrylamide or acrylamide substituted on the alpha carbon atom or on the nitrogen atom.

5. Process of claim 1 wherein the polymer is a terpolymer of a vinyl monomer containing quaternary ammonium groups, a vinyl monomer containing tertiary amine groups, and up to 99 percent by weight of the total of acrylamide or acrylamide substituted on the alpha carbon atom or on the nitrogen atom, the amount of quaternary ammonium groups in the terpolymer being greater than the amount of tertiary amine groups.

6. Process of claim 2 wherein the polymer is poly(β-methacryloyloxyethyltrimethylammonium methyl sulfate).

7. Process of claim 4 wherein the polymer is a copolymer of acrylamide and β-methacryloyloxyethyltrimethylammonium methyl sulfate.

8. Process of claim 4 wherein the polymer is a copolymer of acrylamide and 1,2-dimethyl-5-vinylpyridinium methyl sulfate.

9. Process of claim 1 wherein the polymer is employed in conjunction with a water soluble salt of a polyvalent metal which salt in water solution gives an acid reaction.

10. Process of claim 1 wherein the polymer is employed in conjunction with silica sol and a water soluble salt of a polyvalent metal which salt in water solution gives an acid reaction.

11. Process of claim 6 wherein the polymer is employed in conjunction with a water soluble salt of a polyvalent metal which salt in water solution gives an acid reaction.

12. Process of claim 6 wherein the polymer is employed in conjunction with silica sol and a water soluble salt of a polyvalent metal which salt in water solution gives an acid reaction.

13. Process of claim 2 wherein the polymer is employed in conjunction with a water soluble salt of a polyvalent metal which salt in water solution gives an acid reaction.

14. Process of claim 2 wherein the polymer is employed in conjunction with silica sol and a water soluble salt of a polyvalent metal which salt in water solution gives an acid reaction.

15. Process of claim 7 wherein the polymer is employed in conjunction with a water soluble salt of a polyvalent metal which salt in water solution gives an acid reaction.

16. Process of claim 7 wherein the polymer is employed in conjunction with silica sol and a water soluble salt of a polyvalent metal which salt in water solution gives an acid reaction.

17. Process of claim 8 wherein the polymer is employed in conjunction with a water soluble salt of a polyvalent metal which salt in water solution gives an acid reaction.

18. Process of claim 8 wherein the polymer is employed in conjunction with silica sol and a water soluble salt of a polyvalent metal which salt in water solution gives an acid reaction.

* * * * *